(12) United States Patent
Layouni

(10) Patent No.: US 12,311,903 B2
(45) Date of Patent: May 27, 2025

(54) VEHICLE COLLISION MITIGATION

(71) Applicant: GM Global Technology Operations LLC, Detroit, MI (US)

(72) Inventor: Mohamed A. Layouni, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 17/938,833

(22) Filed: Oct. 7, 2022

(65) Prior Publication Data

US 2024/0116480 A1    Apr. 11, 2024

(51) Int. Cl.
*B60T 7/22*    (2006.01)
*B60Q 9/00*    (2006.01)
*G01S 19/48*    (2010.01)
*G08G 1/052*   (2006.01)
*G08G 1/16*    (2006.01)

(52) U.S. Cl.
CPC ............... *B60T 7/22* (2013.01); *B60Q 9/008* (2013.01); *G01S 19/485* (2020.05); *G08G 1/052* (2013.01); *G08G 1/16* (2013.01); *B60T 2210/32* (2013.01); *B60T 2210/36* (2013.01); *B60T 2250/04* (2013.01)

(58) Field of Classification Search
CPC ...... B60L 58/16; B60L 58/18; B60L 2250/16; B60L 58/13; Y02E 60/10
See application file for complete search history.

(56) References Cited

U.S. PATENT DOCUMENTS

| | | | | |
|---|---|---|---|---|
| 10,684,626 B1* | 6/2020 | Martin | ................. | G08G 1/0962 |
| 2018/0074502 A1* | 3/2018 | Holben | ................. | G05D 1/0257 |
| 2018/0150080 A1* | 5/2018 | Gross | ................. | G08G 1/202 |
| 2018/0204460 A1* | 7/2018 | Deng | ................. | G08G 1/056 |
| 2020/0298848 A1* | 9/2020 | Yanagihara | ........... | B60W 40/04 |
| 2021/0094548 A1* | 4/2021 | Komoguchi | .... | B60W 30/18154 |
| 2022/0063663 A1* | 3/2022 | Wolff | ................. | B60W 60/0027 |
| 2022/0410934 A1* | 12/2022 | Oh | ................. | B60W 60/0015 |
| 2023/0037767 A1* | 2/2023 | Yang | ................. | G08G 1/167 |

FOREIGN PATENT DOCUMENTS

CN            113232649 A  *  8/2021  ............ B60W 30/09

OTHER PUBLICATIONS

EPO machine translated description of reference CN113232649A. (Year: 2021).*

* cited by examiner

*Primary Examiner* — Navid Z. Mehdizadeh
*Assistant Examiner* — Shelley Marie Osterhout
(74) *Attorney, Agent, or Firm* — Vivacqua Crane, PLLC

(57) ABSTRACT

A system for mitigating a vehicle collision includes a global navigation satellite system (GNSS), at least one ranging sensor, and a controller. The controller is programmed to retrieve geographical data including at least a location of the vehicle using the GNSS and determine an activation status based at least in part on the location of the vehicle. The controller is further programed to detect a remote vehicle traveling in a cross-traffic lane relative to the vehicle using the at least one ranging sensor in response to the activation status being the activated status. The controller is further programmed to determine a predicted path of the remote vehicle using the at least one ranging sensor in response to detecting the remote vehicle. The controller is further programmed to perform a collision-mitigating action in response to determining that the predicted path of the remote vehicle is a collision path.

20 Claims, 3 Drawing Sheets

VEHICLE COLLISION MITIGATION

INTRODUCTION

The present disclosure relates to collision avoidance systems and methods for a vehicle.

To increase safety of vehicle occupants, vehicles may be equipped with collision avoidance systems (CAS). Collision avoidance systems are generally designed to prevent and/or reduce the severity of vehicular collisions. Collision avoidance systems may use sensors to gather data about an object (e.g., a remote vehicle, pedestrian, and/or structure) in the environment surrounding the vehicle which may cause a collision. Using the data gathered about the object in the environment and data about the vehicle (e.g., speed, acceleration, and/or steering angle), the collision avoidance system may determine whether a collision is imminent and take action to mitigate an imminent collision. However, current collision avoidance systems may fail to detect an imminent collision due to various factors such as, for example, sensor obstruction, complex roadway configurations, and/or unexpected driver actions. Additionally, current collision avoidance systems may fail to detect an imminent collision in time for effective collision mitigation.

Thus, while current collision avoidance systems achieve their intended purpose, there is a need for a new and improved system and method for mitigating vehicular collisions.

SUMMARY

According to several aspects, a system for mitigating a vehicle collision is provided. The system includes a global navigation satellite system (GNSS) for retrieving geographical data about an environment surrounding a vehicle, at least one ranging sensor for determining a distance between the vehicle and an object in the environment surrounding the vehicle, and a controller in electrical communication with the GNSS and the at least one ranging sensor. The controller is programmed to retrieve geographical data including at least a location of the vehicle using the GNSS and determine an activation status based at least in part on the location of the vehicle, where the activation status includes an activated status and a deactivated status. The controller is further programed to detect a remote vehicle traveling in a cross-traffic lane relative to the vehicle using the at least one ranging sensor in response to the activation status being the activated status. The controller is further programmed to determine a predicted path of the remote vehicle using the at least one ranging sensor in response to detecting the remote vehicle, where the predicted path includes a collision path and a non-collision path. The controller is further programmed to perform a collision-mitigating action in response to determining that the predicted path of the remote vehicle is the collision path.

In another aspect of the present disclosure, to determine the activation status, the controller is further programmed to determine a vehicle traffic priority status based on the location of the vehicle, where the traffic priority status includes a vehicle right-of-way status and a vehicle non-right-of-way status. To determine the activation status, the controller is further programmed to determine a cross-traffic traffic priority status based on the location of the vehicle, where the cross-traffic traffic priority status includes a cross-traffic right-of-way status and a cross-traffic non-right-of-way status. To determine the activation status, the controller is further programmed to determine the activation status to be the activated status in response to determining that the vehicle traffic priority status is the vehicle non-right-of-way status and that the cross-traffic traffic priority status is the cross-traffic right-of-way status.

In another aspect of the present disclosure, to determine the activation status, the controller is further programmed to determine a vehicle traffic priority status based on the location of the vehicle, where the traffic priority status includes a vehicle right-of-way status and a vehicle non-right-of-way status. To determine the activation status, the controller is further programmed to determine a cross-traffic traffic priority status based on the location of the vehicle, where the cross-traffic traffic priority status includes a cross-traffic right-of-way status and a cross-traffic non-right-of-way status. To determine the activation status, the controller is further programmed to identify a remote intersection within a predetermined distance threshold from the vehicle and determine the activation status to be the activated status in response to determining that the vehicle traffic priority status is the vehicle non-right-of-way status and that the cross-traffic traffic priority status is the cross-traffic right-of-way status and identifying the remote intersection within the predetermined distance threshold from the vehicle.

In another aspect of the present disclosure, to detect the remote vehicle traveling in the cross-traffic lane relative to the vehicle, the controller is further programmed to identify the remote vehicle in the environment surrounding the vehicle using the at least one ranging sensor. To detect the remote vehicle traveling in the cross-traffic lane relative to the vehicle, the controller is further programmed to and perform a plurality of distance measurements between the vehicle and the remote vehicle using the at least one ranging sensor to determine a location, velocity, and acceleration of the remote vehicle relative to the vehicle.

In another aspect of the present disclosure, to determine the predicted path of the remote vehicle, the controller is further programmed to compare the velocity of the remote vehicle to a predetermined velocity threshold and determine the predicted path of the remote vehicle to be the collision path in response to determining that the velocity of the remote vehicle is greater than or equal to the predetermined velocity threshold. To determine the predicted path of the remote vehicle, the controller is further programmed to compare the acceleration of the remote vehicle to a first predetermined acceleration threshold, where the first predetermined acceleration threshold is less than zero. To determine the predicted path of the remote vehicle, the controller is further programmed to determine the predicted path of the remote vehicle to be the collision path in response to determining that the acceleration of the remote vehicle is greater than or equal to the first predetermined acceleration threshold.

In another aspect of the present disclosure, to determine the predicted path of the remote vehicle, the controller is further programmed to calculate a safe distance threshold in response to determining that the velocity of the remote vehicle is less than the predetermined velocity threshold and that the acceleration of the remote vehicle is less than the first predetermined acceleration threshold. To determine the predicted path of the remote vehicle, the controller is further programmed to compare the distance between the remote vehicle and the vehicle to the safe distance threshold and determine the predicted path of the remote vehicle to be the collision path in response to determining that the distance between the remote vehicle and the vehicle is less than or equal to the safe distance threshold. To determine the predicted path of the remote vehicle, the controller is further programmed to determine the predicted path of the remote vehicle to be the non-collision path in response to determining that the distance between the remote vehicle and the vehicle is greater than the safe distance threshold.

In another aspect of the present disclosure, to calculate the safe distance threshold, the controller is further programmed to calculate the safe distance threshold based at least in part on a turning time of the vehicle, a predetermined safety factor, and the velocity of the remote vehicle.

In another aspect of the present disclosure, to perform the collision-mitigating action, the controller is further programmed to alert an occupant of the vehicle using at least one of: a haptic seat, a head-up display (HUD) system, and a human-machine interface (HMI).

In another aspect of the present disclosure, to perform the collision-mitigating action, the controller is further programmed to alert an occupant of the remote vehicle using at least one of: a horn of the vehicle and an exterior light of the vehicle.

In another aspect of the present disclosure, to perform the collision-mitigating action, the controller is further programmed to determine an acceleration of the vehicle and compare the acceleration of the vehicle to a second predetermined acceleration threshold. To perform the collision-mitigating action, the controller is further programmed to activate an emergency braking system of the vehicle in response to determining that the acceleration of the vehicle is greater than or equal to the second predetermined acceleration threshold.

According to several aspects, a method for mitigating a vehicle collision is provided. The method includes retrieving geographical data including at least a location of the vehicle using a global navigation satellite system (GNSS) and determining an activation status based at least in part on the location of the vehicle, where the activation status includes an activated status and a deactivated status. The method also includes detecting a remote vehicle traveling in a cross-traffic lane relative to the vehicle using a ranging sensor in response to the activation status being the activated status. The method also includes determining a predicted path of the remote vehicle using the ranging sensor in response to detecting the remote vehicle, where the predicted path includes a collision path and a non-collision path. The method also includes performing a collision-mitigating action in response to determining that the predicted path of the remote vehicle is the collision path.

In another aspect of the present disclosure, determining the activation status further may include determining a vehicle traffic priority status based on the location of the vehicle, where the traffic priority status includes a vehicle right-of-way status and a vehicle non-right-of-way status. Determining the activation status further may include determining a cross-traffic traffic priority status based on the location of the vehicle, where the cross-traffic traffic priority status includes a cross-traffic right-of-way status and a cross-traffic non-right-of-way status. Determining the activation status further may include determining the activation status to be the activated status in response to determining that the vehicle traffic priority status is the vehicle non-right-of-way status and that the cross-traffic traffic priority status is the cross-traffic right-of-way status.

In another aspect of the present disclosure, determining the activation status further may include determining a vehicle traffic priority status based on the location of the vehicle, where the traffic priority status includes a vehicle right-of-way status and a vehicle non-right-of-way status. Determining the activation status further may include determining a cross-traffic traffic priority status based on the location of the vehicle, where the cross-traffic traffic priority status includes a cross-traffic right-of-way status and a cross-traffic non-right-of-way status. Determining the activation status further may include identifying a remote intersection within a predetermined distance threshold from the vehicle. Determining the activation status further may include determining the activation status to be the activated status in response to determining that the vehicle traffic priority status is the vehicle non-right-of-way status and that the cross-traffic traffic priority status is the cross-traffic right-of-way status and identifying the remote intersection within the predetermined distance threshold from the vehicle.

In another aspect of the present disclosure, detecting a remote vehicle traveling in a cross-traffic lane relative to the vehicle further may include identifying the remote vehicle in an environment surrounding the vehicle using the ranging sensor. Detecting a remote vehicle traveling in a cross-traffic lane relative to the vehicle further may include performing a plurality of distance measurements between the vehicle and the remote vehicle using the ranging sensor to determine a location, velocity, and acceleration of the remote vehicle relative to the vehicle.

In another aspect of the present disclosure, determining the predicted path of the remote vehicle further may include comparing the velocity of the remote vehicle to a predetermined velocity threshold. Determining the predicted path of the remote vehicle further may include comparing the acceleration of the remote vehicle to a first predetermined acceleration threshold, where the first predetermined acceleration threshold is less than zero. Determining the predicted path of the remote vehicle further may include calculating a safe distance threshold in response to determining that the velocity of the remote vehicle is less than the predetermined velocity threshold and that the acceleration of the remote vehicle is less than the first predetermined acceleration threshold. Determining the predicted path of the remote vehicle further may include comparing the distance between the remote vehicle and the vehicle to the safe distance threshold. Determining the predicted path of the remote vehicle further may include determining the predicted path of the remote vehicle to be the collision path in response to determining that at least one of: the velocity of the remote vehicle is greater than or equal to the predetermined velocity threshold, the acceleration of the remote vehicle is greater than or equal to the first predetermined acceleration threshold, and that the distance between the remote vehicle and the vehicle is less than or equal to the safe distance threshold. Determining the predicted path of the remote vehicle further may include determining the predicted path of the remote vehicle to be the non-collision path in response to determining that that the velocity of the remote vehicle is less than the predetermined velocity threshold, the acceleration of the remote vehicle is less than the predetermined acceleration threshold, and the distance between the remote vehicle and the vehicle is greater than the safe distance threshold.

In another aspect of the present disclosure, calculating the safe distance threshold further may include calculating the safe distance threshold based at least in part on a turning time of the vehicle, a predetermined safety factor, and the velocity of the remote vehicle.

In another aspect of the present disclosure, performing the collision-mitigating action further may include alerting an occupant of the vehicle using at least one of: a haptic seat, a head-up display (HUD) system, and a human-machine interface (HMI). Performing the collision-mitigating action further may include alerting an occupant of the remote vehicle using at least one of: a horn of the vehicle and an exterior light of the vehicle. Performing the collision-mitigating action further may include determining an acceleration of the vehicle, comparing the acceleration of the vehicle to a second predetermined acceleration threshold and activating an emergency braking system of the vehicle in response to determining that the acceleration of the vehicle is greater than or equal to the second predetermined acceleration threshold.

According to several aspects, a system for mitigating a vehicle collision is provided. The system includes a global navigation satellite system (GNSS) for retrieving geographical data about an environment surrounding the vehicle, at least one ranging sensor for determining a distance between the vehicle and an object in the environment surrounding the vehicle, and a controller in electrical communication with the GNSS and the at least one ranging sensor. The controller is programmed to retrieve geographical data including at least a location of the vehicle using the GNSS and determine an activation status based at least in part on the location of the vehicle, where the activation status includes an activated status and a deactivated status. The controller is further programmed to identify a remote vehicle in the environment surrounding the vehicle using the at least one ranging sensor in response to the activation status being the activated status. The controller is further programmed to perform a plurality of distance measurements between the vehicle and the remote vehicle using the at least one ranging sensor to determine a location, velocity, and acceleration of the remote vehicle relative to the vehicle in response to identifying the remote vehicle in the environment surrounding the vehicle. The controller is further programmed to determine a predicted path of the remote vehicle using the at least one ranging sensor in response to detecting the remote vehicle, where the predicted path includes a collision path and a non-collision path. The controller is further programmed to alert an occupant of the vehicle using at least one of: a haptic seat, a head-up display (HUD) system, and a human-machine interface (HMI) in response to determining that the predicted path of the remote vehicle is the collision path.

In another aspect of the present disclosure, to determine the activation status, the controller is further programmed to determine a vehicle traffic priority status based on the location of the vehicle, where the traffic priority status includes a vehicle right-of-way status and a vehicle non-right-of-way status. To determine the activation status, the controller is further programmed to determine a cross-traffic traffic priority status based on the location of the vehicle, where the cross-traffic traffic priority status includes a cross-traffic right-of-way status and a cross-traffic non-right-of-way status. To determine the activation status, the controller is further programmed to identify a remote intersection within a predetermined distance threshold from the vehicle. To determine the activation status, the controller is further programmed to determine the activation status to be the activated status in response to determining that the vehicle traffic priority status is the vehicle non-right-of-way status and that the cross-traffic traffic priority status is the cross-traffic right-of-way status and identifying the remote intersection within the predetermined distance threshold from the vehicle.

In another aspect of the present disclosure, to determine the predicted path of the remote vehicle, the controller is further programmed to compare the velocity of the remote vehicle to a predetermined velocity threshold. To determine the predicted path of the remote vehicle, the controller is further programmed to compare the acceleration of the remote vehicle to a first predetermined acceleration threshold, where the first predetermined acceleration threshold is less than zero. To determine the predicted path of the remote vehicle, the controller is further programmed to calculate a safe distance threshold in response to determining that the velocity of the remote vehicle is less than the predetermined velocity threshold and that the acceleration of the remote vehicle is less than the first predetermined acceleration threshold, where the safe distance threshold is calculated based at least in part on a turning time of the vehicle, a predetermined safety factor, and the velocity of the remote vehicle. To determine the predicted path of the remote vehicle, the controller is further programmed to compare the distance between the remote vehicle and the vehicle to the safe distance threshold. To determine the predicted path of the remote vehicle, the controller is further programmed to determine the predicted path of the remote vehicle to be the collision path in response to determining that at least one of: the velocity of the remote vehicle is greater than or equal to the predetermined velocity threshold, the acceleration of the remote vehicle is greater than or equal to the first predetermined acceleration threshold, and that the distance between the remote vehicle and the vehicle is less than or equal to the safe distance threshold. To determine the predicted path of the remote vehicle, the controller is further programmed to determine the predicted path of the remote vehicle to be the non-collision path in response to determining that that the velocity of the remote vehicle is less than the predetermined velocity threshold, the acceleration of the remote vehicle is less than the predetermined acceleration threshold, and the distance between the remote vehicle and the vehicle is greater than the safe distance threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
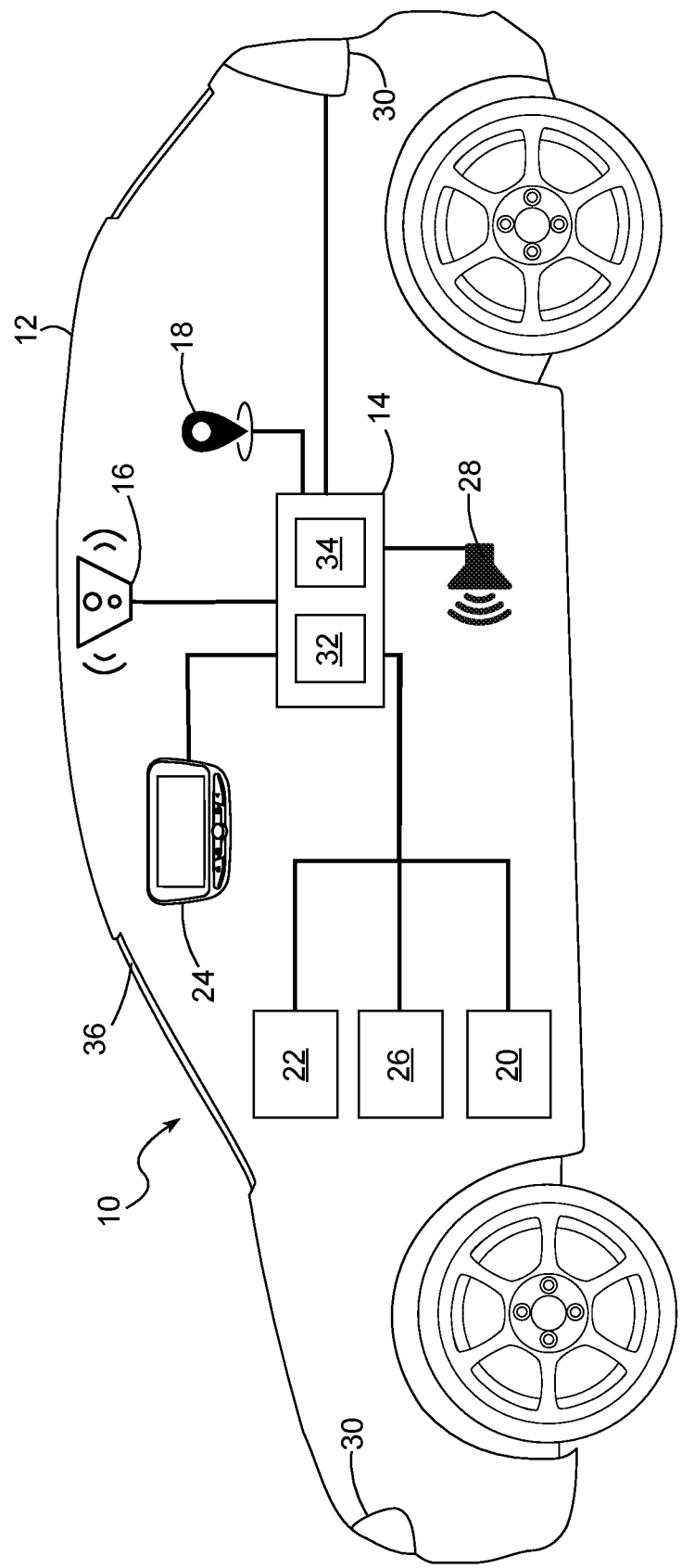
FIG. 1 is a schematic diagram of a system for mitigating a vehicle collision according to an exemplary embodiment.

Referring to FIG. 1, a system for mitigating a vehicle collision is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a ranging sensor 16, a global navigation satellite system (GNSS) 18, an emergency braking system 20, a head-up display (HUD)

system 22, a human-machine interface (HMI) 24, a haptic-feedback seat 26, a horn 28, and an exterior light 30.

The controller 14 is used to implement a method 100 for mitigating a vehicle collision, as will be described below. The controller 14 includes at least one processor 32 and a non-transitory computer readable storage device or media 34. The processor 32 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 34 may include volatile and nonvolatile storage in read-only memory (ROM), random-access memory (RAM), and keep-alive memory (KAM), for example. KAM is a persistent or non-volatile memory that may be used to store various operating variables while the processor 32 is powered down. The computer-readable storage device or media 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12. The controller 14 may also control additional systems of the vehicle 12, such as, for example, interior/exterior lighting systems, safety systems, entertainment systems, and climate control systems.

The controller 14 is in electrical communication with the ranging sensor 16, the GNSS 18, the emergency braking system 20, the HUD system 22, the HMI 24, the haptic-feedback seat 26, the horn 28, and the exterior light 30. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The ranging sensor 16 is used to measure a distance between the vehicle 12 and an object in an environment surrounding the vehicle 12. In the exemplary embodiment depicted in FIG. 1, the ranging sensor 16 is a LiDAR sensor. In an exemplary embodiment, the LiDAR sensor works by targeting the object in the environment with a laser and measuring a time required for reflected light from the laser to return to the LiDAR sensor. Use of alternative and/or additional ranging sensors, such as, for example, ultrasonic ranging sensors, radar sensors, time-of-flight sensors, and/or cameras is within the scope of the present disclosure. The ranging sensor 16 is in electrical communication with the controller 14 as described above.

The GNSS 18 is used to determine a geographical location of the vehicle 12. In an exemplary embodiment, the GNSS 18 is a global positioning system (GPS) and includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. It should be understood that various additional types of satellite-based radionavigation systems, including additional types of global navigation satellite systems (GNSS) are within the scope of the present disclosure.

The emergency braking system 20 is used to bring the vehicle 12 to a stop without input from an occupant of the vehicle. In an exemplary embodiment, the emergency braking system 20 electronically and/or electromechanically activates brakes of the vehicle 12 in response to a software command from the controller 14. In another exemplary embodiment, the emergency braking system 20 uses additional vehicle systems, such as, for example, electric drive motors of the vehicle 12, to bring the vehicle 12 to a stop in response to a software command from the controller 14. The emergency braking system 20 is in electrical communication with the controller as discussed above.

The HUD system 22 is used to display information to an occupant of the vehicle 12 while allowing the occupant to remain focused on the environment surrounding the vehicle 12. In an exemplary embodiment, the HUD system 22 includes a HUD projector (not shown) configured to project graphics, and/or text upon a windscreen 36 of the vehicle 12. The HUD system 22 further includes an occupant position tracking device (not shown) configured to determine a position of the occupant within the vehicle 12. The HUD projector and the occupant position tracking device are in electrical communication with a HUD controller (not shown) which displays graphics and/or text upon the windscreen 36 of the vehicle 12 using the HUD projector based on a location of the occupant as determined by the occupant position tracking device. The controller 14 sends software commands to the HUD controller, causing the HUD controller to display the desired graphics and/or text using the HUD system 22. The graphics and/or text are displayed such that the occupant must not re-focus their eyes from the environment in order to decipher the graphics and/or text, leading to increased occupant awareness. Additionally, urgent information may be displayed directly in a line-of-sight of the occupant using the HUD system 22 resulting in increased occupant awareness. The HUD system 22 is in electrical communication with the controller 14 as discussed above.

The HMI 24 is a display system located in view of the occupant and capable of displaying text, graphics, and/or images. It is to be understood that HMI display systems including LCD displays, LED displays, and the like are within the scope of the present disclosure. Further exemplary embodiments where the HMI 24 is disposed in a rearview mirror are also within the scope of the present disclosure. The HMI 24 is in electrical communication with the controller 14 as discussed above.

The haptic-feedback seat 26 is used to provide feedback to the occupant of the vehicle 12. In an exemplary embodiment, the haptic-feedback seat 26 includes an electric vibration motor in a seat of the vehicle 12. In a non-limiting example, the vibration motor is activated by the controller 14 to warn the occupant of a dangerous road situation. The haptic-feedback seat 26 is in electrical communication with the controller 14 as discussed above.

The horn 28 is used to alert occupants of other vehicles to a movement of the vehicle 12. In an exemplary embodiment, the horn 28 is an electromechanical device designed to produce a noise in the environment surrounding the vehicle 12. The horn 28 is in electrical communication with the controller 14 as discussed above.

The exterior light 30 is a light used to increase the visibility of the vehicle 12 and indicate intentions of the occupant of vehicle 12 to occupants of other vehicles. The exterior light 30 is a light disposed on an exterior of the vehicle 12. In a non-limiting example, the exterior light 30 is a headlight, a turn signal, a hazard light, and/or a brake light of the vehicle 12. In an exemplary embodiment, the exterior light 30 includes multiple lights disposed at various locations on the exterior of the vehicle 12. Various light constructions, such as, for example, LED lights, incandescent lights, and/or halogen lights are within the scope of the present disclosure. The exterior light 30 is in electrical communication with the controller 14 as described above.

Figure 2A:
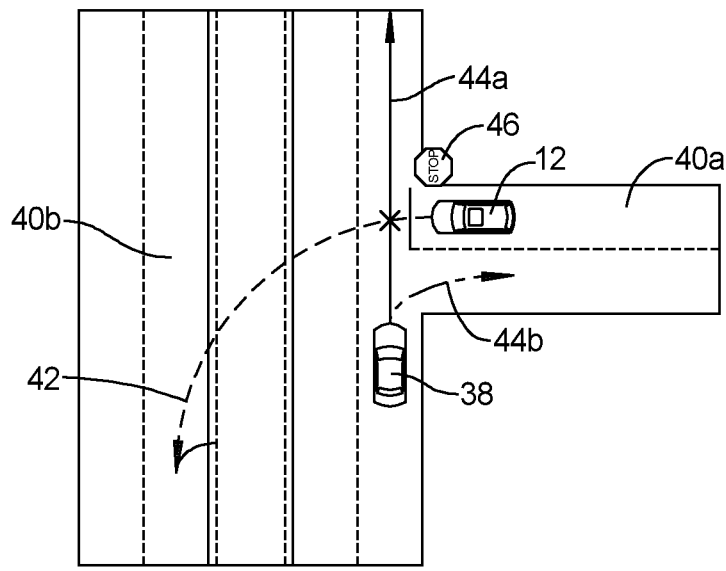
FIG. 2A is a diagram of a first traffic situation according to an exemplary embodiment.
Figure 2B:
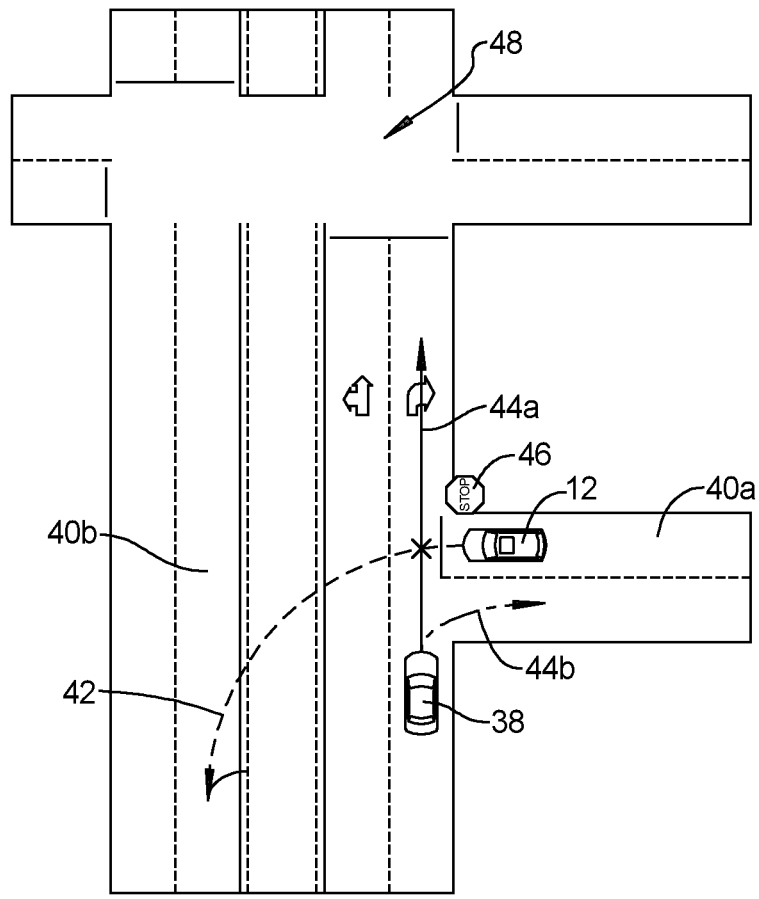
FIG. 2B is a diagram of a second traffic situation according to an exemplary embodiment.

Referring to FIGS. 2A and 2B, exemplary traffic situations are shown. FIG. 2A shows a first traffic situation involving the vehicle 12 and a remote vehicle 38. The vehicle 12 is traveling on a first roadway 40a and making a left turn onto a second roadway 40b, and thus will travel along a vehicle path 42. The remote vehicle 38 may proceed straight, traveling along a first remote vehicle path 44a, or make a right turn, traveling along a second remote vehicle path 44b. The traffic sign 46 indicates right-of-way, as will be discussed below. FIG. 2B shows a second traffic situation involving the vehicle 12 and the remote vehicle 38. The second traffic situation in FIG. 2B additionally includes a remote intersection 48.

Figure 3:
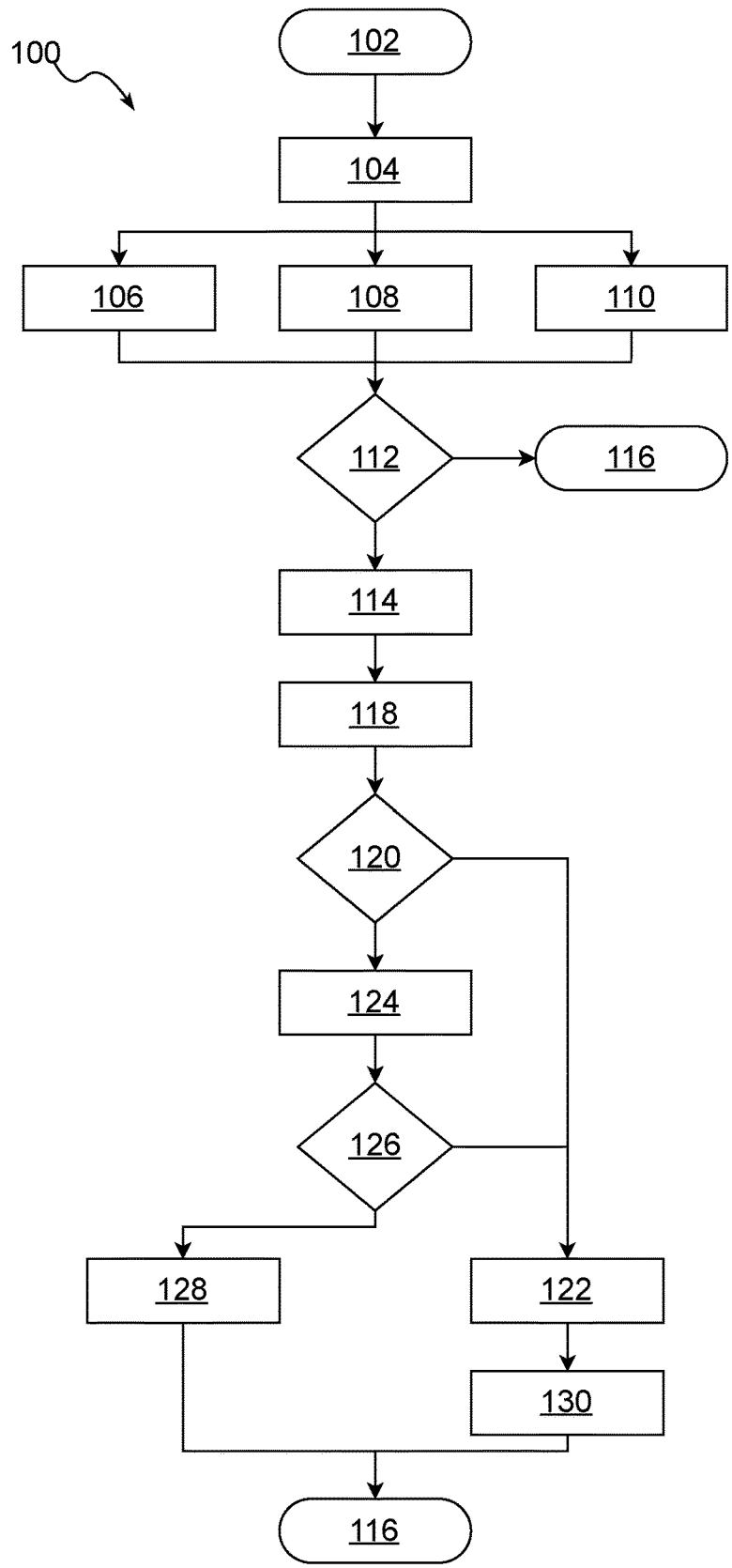
FIG. 3 is a flowchart of a method for mitigating a vehicle collision according to an exemplary embodiment.

Referring to FIG. 3, a flowchart of the method 100 for mitigating a vehicle collision is shown. The method 100 begins at block 102 and proceeds to block 104. At block 104, the controller 14 uses the GNSS 18 to retrieve geographical data about the vehicle 12, including a location of the vehicle 12. In an exemplary embodiment, the geographical data also includes road data, such as, for example, road configuration, right-of-way, and/or traffic sign/signal location data. After block 104, the method 100 proceeds to blocks 106, 108, and 110.

At block 106, the controller 14 determines a vehicle traffic priority status. In the scope of the present disclosure, the vehicle traffic priority status indicates whether the vehicle 12 has right-of-way in the current traffic situation. In the scope of the present disclosure, a vehicle having right-of-way has the right to use a conflicting portion of a roadway (e.g., an intersection between two roadways) without yielding to other vehicles. Therefore, vehicles not having right-of-way must yield to vehicles having right-of-way. In an exemplary embodiment, the geographical data retrieved at block 104 using the GNSS 18 contains right-of-way data as discussed above in reference to block 104. In another exemplary embodiment, the controller 14 accesses a database of right-of-way information for roadway intersections and determines the vehicle traffic priority status based on the location of the vehicle 12 from the geographical data retrieved at block 104 using the GNSS 18. The database of right-of-way information may be stored in the media 34 of the controller 14 or on a remote system, for example, a server computer connected to the internet.

In the exemplary embodiments depicted in FIGS. 2A and 2B, the vehicle 12 does not have right-of-way, as indicated by the traffic sign 46.

At block 108, the controller 14 determines a cross-traffic traffic priority status. In the scope of the present disclosure, the cross-traffic traffic priority status indicates whether vehicles travelling on a roadway which is substantially perpendicular to a roadway upon which the vehicle 12 is travelling have right-of-way in the current traffic situation.

In the exemplary embodiments depicted in FIGS. 2A and 2B, the second roadway 40b is substantially perpendicular to the first roadway 40a upon which the vehicle 12 is travelling. As indicated by the absence of traffic signs/signals, vehicles travelling on the second roadway 40b (e.g., the remote vehicle 38) have right-of-way.

At block 110, the controller 14 determines whether the remote intersection 48 is within a predetermined distance threshold from the vehicle 12 using the geographical data retrieved at block 104. In a non-limiting example, the predetermined distance threshold is an occupant-controlled setting of the system 10, controlled by the occupant using the HMI 24. In an alternative embodiment, block 110 is omitted from the method 100. After blocks 106, 108, and 110, the method 100 proceeds to block 112.

At block 112, an activation status of the method 100 is determined. If the vehicle 12 is determined not to have right-of-way at block 106, the cross-traffic is determined to have right-of-way at block 108, and the remote intersection 48 is within the predetermined distance threshold, the method 100 proceeds to block 114. Otherwise, the method 100 proceeds to enter a standby state at block 116. In the alternative embodiment, if the vehicle 12 is determined not to have right-of-way at block 106 and the cross-traffic is determined to have right-of-way at block 108 the method 100 proceeds to block 114. Otherwise, the method 100 proceeds to enter the standby state at block 116.

At block 114, the controller 14 identifies the remote vehicle 38 in the environment surrounding the vehicle 12 using the ranging sensor 16. In an exemplary embodiment, the controller 14 uses the ranging sensor 16 to take a plurality of measurements of the environment surrounding the vehicle 12. By analyzing the plurality of measurements, the controller 14 identifies the remote vehicle 38. After block 114, the method 100 proceeds to block 118.

At block 118, the controller 14 uses the ranging sensor 16 to perform a plurality of distance measurements between the vehicle 12 and the remote vehicle 38. The controller 14 then uses the plurality of distance measurements to determine a location, velocity, and acceleration of the remote vehicle 38 relative to the vehicle 12. The controller 14 additionally determines a distance between the vehicle 12 and the remote vehicle 38. After block 118, the method 100 proceeds to block 120.

At block 120, the velocity of the remote vehicle 38 is compared to a predetermined velocity threshold (e.g., ten miles per hour). Additionally, the acceleration of the remote vehicle 38 is compared to a predetermined acceleration threshold (e.g., negative five miles per hours per second). If either the velocity of the remote vehicle 38 is greater than or equal to the predetermined velocity threshold or the acceleration of the remote vehicle 38 is greater than or equal to the predetermined acceleration threshold, the method 100 proceeds to block 122, as will be discussed in greater detail below. Otherwise, the method 100 proceeds to block 124.

At block 124, the controller 14 calculates a safe distance threshold. In the scope of the present disclosure, the safe distance threshold defines a distance between the vehicle 12 and the remote vehicle 38 at which the vehicle 12 may safely enter a roadway upon which the remote vehicle 38 is driving (e.g., the second roadway 40b). In an exemplary embodiment, the safe distance threshold is calculated based at least in part on a turning time of the vehicle, a predetermined safety factor, and the velocity of the remote vehicle as determined at block 118.

In the scope of the present disclosure, the turning time of the vehicle 12 is a predetermined value defining an amount of time required for the vehicle 12 to complete a turn from the first roadway 40a onto the second roadway 40b. In a non-limiting example, the turning time of the vehicle 12 is one second. The turning time of the vehicle 12 may be adjusted based on factors such as, for example, the size of the vehicle 12. In the scope of the present disclosure, the predetermined safety factor is a predetermined value defining an additional amount of time provided to account for factors such as, for example, occupant reaction time, vehicle performance, and/or road conditions. In a non-limiting example, the predetermined safety factor is three seconds. After block 124, the method 100 proceeds to block 126.

At block 126, the distance between the vehicle 12 and the remote vehicle 38 determined at block 118 is compared to the safe distance threshold determined at block 124. If the distance between the vehicle 12 and the remote vehicle 38 is less than or equal to the safe distance threshold, the method 100 proceeds to block 122. If the distance between the vehicle 12 and the remote vehicle 38 is greater than the safe distance threshold, the method 100 proceeds to block 128.

At block 128, a predicted path of the remote vehicle 38 is determined to be a non-collision path. In the scope of the present disclosure, the predicted path of the remote vehicle 38 is a path along which the remote vehicle 38 is predicted to travel. The non-collision path is a predicted path wherein the remote vehicle 38 will not collide with the vehicle 12. A collision path is a predicted path wherein the remote vehicle 38 will collide with the vehicle 12. In the examples depicted in FIGS. 2A and 2B, the first remote vehicle path 44a is the collision path, because the first remote vehicle path 44a intersects with the vehicle path 42. The second remote vehicle path 44b is the non-collision path, because the second remote vehicle path 44b does not intersect with the vehicle path 42. After block 128, the method 100 proceeds to enter the standby state at block 116.

At block 122, the predicted path of the remote vehicle 38 is determined to be the collision path. The meaning of the collision path in the scope of the present disclosure is discussed above in reference to block 128. After block 122, the method 100 proceeds to block 130.

At block 130, the controller 14 performs a collision-mitigating action. In a first exemplary embodiment, the collision-mitigating action includes using the HMI 24 and/or the HUD 22 to alert the occupant of the vehicle 12, allowing the occupant to take action to prevent a collision with the remote vehicle 38. In a second exemplary embodiment, the collision-mitigation action includes determining an acceleration of the vehicle 12, comparing the acceleration of the vehicle 12 to a second predetermined acceleration threshold (e.g., one mile per hour per second), and activating the emergency braking system 20 in response to determining that the acceleration of the vehicle 12 is greater than or equal to the second predetermined acceleration threshold. In a third exemplary embodiment, the controller 14 first alerts the occupant of the remote vehicle 38 using the horn 28 and/or the exterior light 30 of the vehicle 12, thus allowing the occupant of the remote vehicle 38 to take action to prevent a collision. In yet another exemplary embodiment, the collision-mitigating action includes any combination of the aforementioned first, second, and third exemplary embodiments. After block 130, the method 100 proceeds to enter the standby state at block 116.

In an exemplary embodiment, the controller 14 repeatedly exits the standby state 116 and restarts the method 100 at block 102. In a non-limiting example, the controller 14 exits the standby state 116 and restarts the method 100 on a timer, for example, every three hundred milliseconds.

The system and method for mitigating a collision of the present disclosure offer several advantages. Using the system and method of the present disclosure, the controller 14 may determine that the remote vehicle 38 is travelling along the collision path before the vehicle 12 has begun to move, allowing early collision mitigation. Early prediction of a collision allows more time for effective collision mitigation and reduces the chance of dangerous traffic conditions arising from a near-miss collision situation. The system and method of the present disclosure may increase occupant awareness and thus improve occupant safety.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for mitigating a vehicle collision, the system comprising:
   a global navigation satellite system (GNSS) for retrieving geographical data about an environment surrounding a vehicle;
   at least one ranging sensor for determining a distance between the vehicle and an object in the environment surrounding the vehicle; and
   a controller in electrical communication with the GNSS and the at least one ranging sensor, wherein the controller is programmed to:
      retrieve geographical data including at least a location of the vehicle using the GNSS;
      determine a collision-mitigating activation status based at least in part on the location of the vehicle, wherein the collision-mitigating activation status includes an activated status and a deactivated status;
      detect a remote vehicle traveling in a cross-traffic lane relative to the vehicle using the at least one ranging sensor in response to the collision-mitigating activation status being the activated status, wherein to detect the remote vehicle traveling in the cross-traffic lane relative to the vehicle, the controller is further programmed to:
         identify the remote vehicle in the environment surrounding the vehicle using the at least one ranging sensor; and
         perform a plurality of distance measurements between the vehicle and the remote vehicle using the at least one ranging sensor to determine a location, a velocity, and an acceleration of the remote vehicle relative to the vehicle;
      determine a predicted path of the remote vehicle using the at least one ranging sensor in response to detecting the remote vehicle, wherein the predicted path includes a collision path and a non-collision path, wherein to determine the predicted path of the vehicle, the controller is further programmed to:
         compare the velocity of the remote vehicle to a predetermined velocity threshold;
         determine the predicted path of the remote vehicle to be the collision path in response to determining that the velocity of the remote vehicle is greater than or equal to the predetermined velocity threshold;
         compare the acceleration of the remote vehicle to a first predetermined acceleration threshold, wherein the first predetermined acceleration threshold is less than zero; and determine the predicted path of the remote vehicle to be the collision path in response to determining that the acceleration of the remote vehicle is greater than or equal to the first predetermined acceleration threshold;

calculate a safe distance threshold in response to determining that the velocity of the remote vehicle is less than the predetermined velocity threshold and that the acceleration of the remote vehicle is less than the first predetermined acceleration threshold;

compare the distance between the remote vehicle and the vehicle to the safe distance threshold;

determine the predicted path of the remote vehicle to be the collision path in response to determining that the distance between the remote vehicle and the vehicle is less than or equal to the safe distance threshold; and determine the predicted path of the remote vehicle to be the non-collision path in response to determining that the distance between the remote vehicle and the vehicle is greater than the safe distance threshold; and perform a collision-mitigating action in response to determining that the predicted path of the remote vehicle is the collision path.

2. The system of claim 1, wherein to determine the collision-mitigating activation status, the controller is further programmed to:

determine a vehicle traffic priority status based on the location of the vehicle, wherein the vehicle traffic priority status includes a vehicle right-of-way status and a vehicle non-right-of-way status;

determine a cross-traffic traffic priority status based on the location of the vehicle, wherein the cross-traffic traffic priority status includes a cross-traffic right-of-way status and a cross-traffic non-right-of-way status; and determine the collision-mitigating activation status to be the activated status in response to determining that the vehicle traffic priority status is the vehicle non-right-of-way status and that the cross-traffic traffic priority status is the cross-traffic right-of-way status.

3. The system of claim 2, wherein the cross-traffic traffic priority status indicates whether vehicles travelling on a roadway which is substantially perpendicular to a roadway upon which the vehicle is travelling have right-of-way.

4. The system of claim 1, wherein to determine the collision-mitigating activation status, the controller is further programmed to:

determine a vehicle traffic priority status based on the location of the vehicle, wherein the vehicle traffic priority status includes a vehicle right-of-way status and a vehicle non-right-of-way status;

determine a cross-traffic traffic priority status based on the location of the vehicle, wherein the cross-traffic traffic priority status includes a cross-traffic right-of-way status and a cross-traffic non-right-of-way status;

identify a remote intersection within a predetermined distance threshold from the vehicle; and determine the collision-mitigating activation status to be the activated status in response to determining that the vehicle traffic priority status is the vehicle non-right-of-way status and that the cross-traffic traffic priority status is the cross-traffic right-of-way status and identifying the remote intersection within the predetermined distance threshold from the vehicle.

5. The system of claim 1, wherein to calculate the safe distance threshold, the controller is further programmed to:

calculate the safe distance threshold based at least in part on a turning time of the vehicle, a predetermined safety factor, and the velocity of the remote vehicle.

6. The system of claim 1, wherein to perform the collision-mitigating action, the controller is further programmed to:

alert an occupant of the vehicle using at least one of: a haptic seat, a head-up display (HUD) system, and a human-machine interface (HMI).

7. The system of claim 1, wherein to perform the collision-mitigating action, the controller is further programmed to:

alert an occupant of the remote vehicle using at least one of: a horn of the vehicle and an exterior light of the vehicle.

8. The system of claim 1, wherein to perform the collision-mitigating action, the controller is further programmed to:

determine an acceleration of the vehicle;

compare the acceleration of the vehicle to a second predetermined acceleration threshold; and activate an emergency braking system of the vehicle in response to determining that the acceleration of the vehicle is greater than or equal to the second predetermined acceleration threshold.

9. The system of claim 1, wherein the at least one ranging sensor includes a light detection and ranging (LiDAR) sensor.

10. The system of claim 1, wherein the at least one ranging sensor includes a camera.

11. A method for mitigating a vehicle collision, the method comprising:

retrieving geographical data including at least a location of a vehicle using a global navigation satellite system (GNSS);

determining a collision-mitigating activation status based at least in part on the location of the vehicle, wherein the collision-mitigating activation status includes an activated status and a deactivated status;

detecting a remote vehicle traveling in a cross-traffic lane relative to the vehicle using a ranging sensor in response to the collision-mitigating activation status being the activated status, wherein detecting a remote vehicle traveling in a cross-traffic lane relative to the vehicle further comprises:

identifying the remote vehicle in an environment surrounding the vehicle using the ranging sensor; and performing a plurality of distance measurements between the vehicle and the remote vehicle using the ranging sensor to determine a location, a velocity, and an acceleration of the remote vehicle relative to the vehicle;

determining a predicted path of the remote vehicle using the ranging sensor in response to detecting the remote vehicle, wherein the predicted path includes a collision path and a non-collision path, wherein determining the predicted path of the remote vehicle further comprises:

comparing the velocity of the remote vehicle to a predetermined velocity threshold;

comparing the acceleration of the remote vehicle to a first predetermined acceleration threshold, wherein the first predetermined acceleration threshold is less than zero;

calculating a safe distance threshold in response to determining that the velocity of the remote vehicle is less than the predetermined velocity threshold and that the acceleration of the remote vehicle is less than the first predetermined acceleration threshold;

comparing a distance between the remote vehicle and the vehicle to the safe distance threshold;

determining the predicted path of the remote vehicle to be the collision path in response to determining that at least one of: the velocity of the remote vehicle is greater than or equal to the predetermined velocity threshold, the acceleration of the remote vehicle is greater than or equal to the first predetermined acceleration threshold, and that the distance between the remote vehicle and the vehicle is less than or equal to the safe distance threshold; and determining the predicted path of the remote vehicle to be the non-collision path in response to determining that that the velocity of the remote vehicle is less than the predetermined velocity threshold, the acceleration of the remote vehicle is less than the first predetermined acceleration threshold, and the distance between the remote vehicle and the vehicle is greater than the safe distance threshold; and performing a collision-mitigating action in response to determining that the predicted path of the remote vehicle is the collision path.

12. The method of claim 11, wherein determining the collision-mitigating activation status further comprises:

determining a vehicle traffic priority status based on the location of the vehicle, wherein the vehicle traffic priority status includes a vehicle right-of-way status and a vehicle non-right-of-way status;

determining a cross-traffic traffic priority status based on the location of the vehicle, wherein the cross-traffic traffic priority status includes a cross-traffic right-of-way status and a cross-traffic non-right-of-way status; and determining the collision-mitigating activation status to be the activated status in response to determining that the vehicle traffic priority status is the vehicle non-right-of-way status and that the cross-traffic traffic priority status is the cross-traffic right-of-way status.

13. The method of claim 11, wherein determining the collision-mitigating activation status further comprises:

determining a vehicle traffic priority status based on the location of the vehicle, wherein the vehicle traffic priority status includes a vehicle right-of-way status and a vehicle non-right-of-way status;

determining a cross-traffic traffic priority status based on the location of the vehicle, wherein the cross-traffic traffic priority status includes a cross-traffic right-of-way status and a cross-traffic non-right-of-way status;

identifying a remote intersection within a predetermined distance threshold from the vehicle; and determining the collision-mitigating activation status to be the activated status in response to determining that the vehicle traffic priority status is the vehicle non-right-of-way status and that the cross-traffic traffic priority status is the cross-traffic right-of-way status and identifying the remote intersection within the predetermined distance threshold from the vehicle.

14. The method of claim 13, wherein determining the vehicle traffic priority status further comprises:

determining the vehicle traffic priority status based at least in part on the geographical data, wherein the geographical data further includes right-of-way data.

15. The method of claim 11, wherein calculating the safe distance threshold further comprises:

calculating the safe distance threshold based at least in part on a turning time of the vehicle, a predetermined safety factor, and the velocity of the remote vehicle.

16. The method of claim 11, wherein performing the collision-mitigating action further comprises:

alerting an occupant of the vehicle using at least one of: a haptic seat, a head-up display (HUD) system, and a human-machine interface (HMI);

alerting an occupant of the remote vehicle using at least one of: a horn of the vehicle and an exterior light of the vehicle; and activating an emergency braking system of the vehicle.

17. The method of claim 16, wherein activating the emergency braking system of the vehicle further comprises:

determining an acceleration of the vehicle;

comparing the acceleration of the vehicle to a second predetermined acceleration threshold; and activating the emergency braking system of the vehicle in response to determining that the acceleration of the vehicle is greater than or equal to the second predetermined acceleration threshold.

18. A system for mitigating a vehicle collision, the system comprising:

a global navigation satellite system (GNSS) for retrieving geographical data about an environment surrounding a vehicle;

at least one ranging sensor for determining a distance between the vehicle and an object in the environment surrounding the vehicle; and a controller in electrical communication with the GNSS and the at least one ranging sensor, wherein the controller is programmed to:

retrieve geographical data including at least a location of the vehicle using the GNSS;

determine a collision-mitigating activation status based at least in part on the location of the vehicle, wherein the collision-mitigating activation status includes an activated status and a deactivated status;

identify a remote vehicle in the environment surrounding the vehicle using the at least one ranging sensor in response to the collision-mitigating activation status being the activated status;

perform a plurality of distance measurements between the vehicle and the remote vehicle using the at least one ranging sensor to determine a location, velocity, and acceleration of the remote vehicle relative to the vehicle in response to identifying the remote vehicle in the environment surrounding the vehicle;

determine a predicted path of the remote vehicle using the at least one ranging sensor in response to detecting the remote vehicle, wherein the predicted path includes a collision path and a non-collision path, wherein to determine the predicted path of the remote vehicle, the controller is further programmed to:

compare the velocity of the remote vehicle to a predetermined velocity threshold;

compare the acceleration of the remote vehicle to a first predetermined acceleration threshold, wherein the first predetermined acceleration threshold is less than zero;

calculate a safe distance threshold in response to determining that the velocity of the remote vehicle is less than the predetermined velocity threshold and that the acceleration of the remote vehicle is less than the first predetermined acceleration threshold, wherein the safe distance threshold is calculated based at least in part on a turning time of the vehicle, a predetermined safety factor, and the velocity of the remote vehicle;

compare the distance between the remote vehicle and the vehicle to the safe distance threshold;

determine the predicted path of the remote vehicle to be the collision path in response to determining that at least one of: the velocity of the remote vehicle is greater than or equal to the predetermined velocity threshold, the acceleration of the remote vehicle is greater than or equal to the first predetermined acceleration threshold, and that the distance between the remote vehicle and the vehicle is less than or equal to the safe distance threshold; and determine the predicted path of the remote vehicle to be the non-collision path in response to determining that that the velocity of the remote vehicle is less than the predetermined velocity threshold, the acceleration of the remote vehicle is less than the first predetermined acceleration threshold, and the distance between the remote vehicle and the vehicle is greater than the safe distance threshold; and alert an occupant of the vehicle using at least one of: a haptic seat, a head-up display (HUD) system, and a human-machine interface (HMI) in response to determining that the predicted path of the remote vehicle is the collision path.

19. The system of claim 18, wherein to determine the collision-mitigating activation status, the controller is further programmed to:

determine a vehicle traffic priority status based on the location of the vehicle, wherein the vehicle traffic priority status includes a vehicle right-of-way status and a vehicle non-right-of-way status;

determine a cross-traffic traffic priority status based on the location of the vehicle, wherein the cross-traffic traffic priority status includes a cross-traffic right-of-way status and a cross-traffic non-right-of-way status;

identify a remote intersection within a predetermined distance threshold from the vehicle; and determine the collision-mitigating activation status to be the activated status in response to determining that the vehicle traffic priority status is the vehicle non-right-of-way status and that the cross-traffic traffic priority status is the cross-traffic right-of-way status and identifying the remote intersection within the predetermined distance threshold from the vehicle.

20. The system of claim 18, further comprising an emergency braking system in electrical communication with the controller, and wherein the controller is further programmed to:

activate the emergency braking system in response to determining that the predicted path of the remote vehicle is the collision path.

* * * * *